Patented July 30, 1940

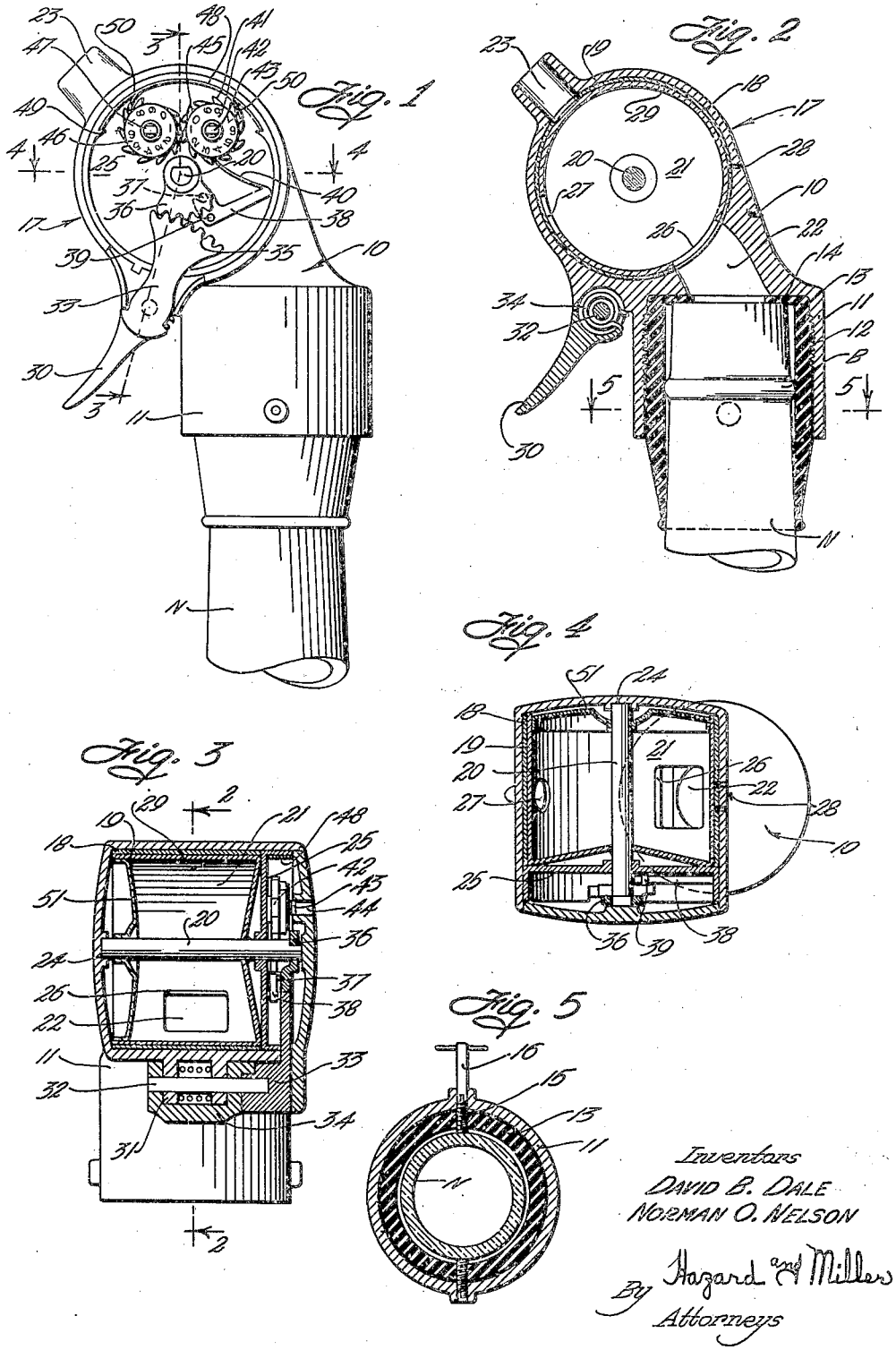

2,209,766

UNITED STATES PATENT OFFICE 2,209,766

COUNTING AND MEASURING DISPENSER FOR BOTTLES

David B. Dale, Los Angeles, and Norman O. Nelson, Sierra Madre, Calif.

Application January 16, 1939, Serial No. 251,208

4 Claims. (Cl. 221—106)

This invention relates to a counting and measuring dispenser for bottles. An object of the invention is to provide a device applicable to any conventional form of bottle such as for example bottles containing liquids which will measure and dispense on each operation a predetermined quantity of the contents of the bottle. Associated with the dispensing mechanism is a counting mechanism serving to record or register each time that the mechanism is operated to dispense the predetermined quantity of the bottle contents.

At places where liquids are dispensed considerable loss is noted where bartenders are supplied with bottles from which drinks are poured. This is sometimes occasioned by some of the contents being accidentally spilled and sometimes by the bartender undertaking without authority to favor certain customers or purchasers. In some instances the loss occasioned in these manners accumulates to a considerable amount. Even when no material loss is experienced, difficulty is encountered in taking inventory from time to time in that when the inventory is taken the contents of a partially consumed bottle can only be estimated. The estimating is difficult in that many liquid bottles have distinctive shapes and designs. Although the total contents of any particular bottle is generally known, when part of the contents has been removed, it is impossible to definitely estimate that portion remaining in the bottle because of the differences in shapes and sizes.

By means of the present device the dispensing of a predetermined quantity of the contents of the bottle is facilitated enabling the predetermined quantity to be quickly poured into a glass or other container without danger of spilling. Furthermore, as the quantity poured per dispensing is measured, it is not necessary to carefully fill a glass or container of predetermined size up to the brim. Instead, the contents from the measuring receptacle can be quickly poured as fast as possible with assurance that the entire predetermined quantity purchased will be delivered to the customer or purchaser. By having the improved mechanism such that it registers each time that the predetermined quantity of the bottle contents is dispensed, it is possible to determine with accuracy on taking inventory the exact amount still remaining in a partially consumed bottle.

Another object of the invention is to provide a counting and measuring dispenser for bottles and similar containers which is a very simple and durable construction and which may be easily and conveniently operated and to provide means whereby the magnitude of the predetermined quantity can be adjusted or varied.

With the foregoing and other objects in view, which will be made manifest in the following detailed description and specifically pointed out in the appended claims, reference is had to the accompanying drawing for an illustrative embodiment of the invention, wherein:

Fig. 1 is a view in side elevation of the neck of a bottle illustrating the device embodying the invention as having been applied thereto, the device being shown as having the end of the housing removed so as to illustrate the counting and operating mechanism therewithin.

Fig. 2 is a vertical section taken through the center of the dispensing mechanism shown in Fig. 1.

Fig. 3 is a sectional view taken substantially upon the line 3—3 upon Fig. 1.

Fig. 4 is a horizontal section taken substantially upon the line 4—4 upon Fig. 1.

Fig. 5 is a horizontal section taken substantially upon the line 5—5 of Fig. 2.

Referring to the accompanying drawing wherein similar reference characters designate similar parts throughout, N designates the neck of a bottle such as for example a whiskey bottle. The necks on such bottles are generally equipped with a small bead B or a small shoulder adjacent the mouth of the bottle. The device embodying the invention illustrated as having been applied to the neck consists of a suitable housing 10, one end of which is enlarged as indicated at 11 so as to be receivable over the top of the neck N. In the preferred form of construction, this enlargement 11 is internally threaded as at 12 for engagement with a rubber bushing 13 designed to slip over the neck N. This rubber bushing has an inwardly extending flange 14 at its top which is engageable with the top of the neck. On opposite sides of the enlargement 11 the enlargement is tapped and threaded for the reception of screws 15 having irregularly shaped outer ends engageable by a key 16. These screws extend through the bushing and on rotation of the key 16 they may be tightened against the neck of the bottle beneath the bead B so as to lock the device in place on the bottle and to prevent its removal until the key 16 is used to unscrew them.

The housing 10 also provides a cylindrical center portion generally designated at 17 lined with a cylindrical bushing 18 preferably formed of a bearing forming metal. Within the bushing 18 there is disposed a cylindrical member 19 rotatable by means of a transverse shaft 20. The cylindrical member provides a chamber 21 for the reception of a predetermined portion of the contents of the bottle. Ingress thereto is provided by means of an inlet 22 leading from the neck of the bottle. An outlet is provided by means of a short nipple or extension 23 formed integral with the housing. One end of shaft 20 is rotatably mounted in a recess 24 at one end of the housing while the other end of the shaft is rotatably mounted in a partition 25 spaced inwardly from the other end of the housing. The cylindrical member 19 is designed to rotate within the bushing 18 and has an aperture 26 adapted to be brought into registration with the inlet 22 as shown in Fig. 2. It is also equipped with an aperture 27 which can be brought into registration with the outlet 23 on rotation of the cylindrical member 19. The housing is also equipped with several vent openings 28 and corresponding vent openings 29 are formed in the rotatable cylindrical member which will register with the vent openings 28 when aperture 27 is in registration with the outlet 23. Rotation of the cylindrical member 19 is accomplished by means of a trigger 30 mounted for rotation upon ears 31 formed on the housing. A pintle 32 extends through the ears and through the top of the trigger into the bottom of an arm 33. A spring 34 is disposed around the pintle between the ears and normally urges the trigger 30 into the position shown in Figs. 1 and 2. It will be understood that the end of pintle 32 is keyed or otherwise rigidly attached to arm 33 so that when trigger 30 is depressed, arm 33 will be swung thereby. The upper end of arm 33 is equipped with a segmental gear or gear teeth 35 meshing with the segmental gear or pinion 36 on the end of shaft 20. Thus by depressing trigger 30 against the action of the coil spring 34, arm 33 will rotate shaft 20 and thus rotate the cylindrical member 19. On the back of the segmental pinion 36 there is a pin 37 disposed in a notch in one arm of a pivoted crank 38 which is pivoted on a pin indicated at 39 mounted on partition 25. The other arm of the crank carries a spring pawl 40 engageable with the teeth 41 on a rotary counter-wheel 42. This counter-wheel is mounted for rotation on the partition 25, it being rigid with a small stub shaft 43 which is rotatably mounted on the partition. The end of this stub shaft is irregularly shaped similarly to the ends of screws 15 so that by applying the key 16 through an opening 44 in the end of the housing, the counter-wheel may be returned to zero or starting position. On the back of the counter-wheel 42 there is one lug indicated at 45 engageable with the teeth on a counter-wheel 46 which is likewise mounted for rotation on partition 25 by means of a stub shaft 47. The key 16 may likewise be applied to this stub shaft to return this counter-wheel to zero position. Within the housing there is disposed a strip of spring metal 48 held in place by means of shoulders 49 and having struck therefrom spring pawls 50 serving as back-up pawls which prevent reverse rotation of the counter-wheels. The end of the housing is provided with a sight opening permitting the numerals on the counter-wheels to be seen therethrough.

Within one end of the cylindrical member 19 there is disposed a reversible end 51. This reversible end may be slipped on to shaft 20 so as to assume the position shown in Fig. 3 wherein it is spaced from the adjacent end of the housing or it may assume the position as shown in Fig. 4 wherein it is adjacent the end of the housing. By properly positioning this end, the quantity of the contents of the bottle that may be retained within chamber 21 can be varied. For example, if this reversible end is applied to the shaft in the position shown in Fig. 4, the contents of chamber 21 may be one full liquid ounce whereas if it assumes the position as shown in Fig. 3, the contents of chamber 21 may be only 7/8 of one full liquid ounce. This adjustment is provided to enable variation in the quantity dispensed per operation, depending upon the nature of the liquor contained in the bottle.

The operation and advantages of the improved construction are as follows: with the device applied to the neck of the bottle and it being desirable to dispense a drink therefrom, the bartender inverts the bottle causing the contents to flow through inlet 22 into chamber 21. This is very easily and quickly accomplished in that the bottle may be turned entirely upside down without danger of any of the contents spilling or leaking. When the chamber 21 has been filled, trigger 30 is then depressed causing the cylindrical member 19 to be rotated within the housing. This cylindrical member functions somewhat as a valve in that inlet 22 is first closed so as to isolate the contents in chamber 21 from the contents remaining in the bottle. Continuing the rotation of the cylindrical member 19 brings aperture 27 into registration with outlet 23 and this functions somewhat as a valve to open the outlet. At the same time vent openings 29 are brought into registration with vent openings 28 so that air may enter chamber 21 as the liquid contents therein are poured through the outlet 23. In this way a drink may be dispensed from the bottle very quickly in that the contents of chamber 21 may be emptied into a glass about as fast as the liquid can be poured. At the same time the customer or purchaser is assured of securing the full quantity paid for.

During the operation rotation of the segmental pinion 36 produces a swinging of the crank 38 and an advancement of counterwheel 42 one digit. In this way each drink dispensed from the bottle is recorded on the register formed by the two counterwheels. It will be obvious that on each complete rotation of counterwheel 42 the counterwheel 46 will be advanced one tooth. Not only does the improved device facilitate the quick dispensing of a predetermined quantity but a record is kept of the number of drinks dispensed from the bottle. On taking an inventory the portion of the contents remaining in the bottle can be readily determined by subtracting the number of drinks recorded on the counting mechanism from the original total liquid contents of the bottle. Whenever a bottle has been emptied key 16 may be used to loosen screws 15 and to return the counting mechanism to zero position after which the device may be applied to a new bottle.

It will be noted that the counter or register wheel 46 has a tooth missing opposite digit 9. The purpose of this construction is to prevent continued operation of the device returning the register or counter to zero. In other words, if the device should be applied to a new bottle of liquor and a fraudulent bartender desired to give a number of drinks to favorite friends or customers, each drink dispensed of course would be registered on the register or counter and the fraudulent bartender might wish to operate the trigger consecutively until the register and counter had passed to the zero-zero position of the register which would indicate that no liquor had been dispensed from the bottle, with the tooth opposite the digit 9 on wheel 46 omitted continued operation of the device would not return the counter or register to zero-zero position but instead the reading would be either 90 or from 91 to 99.

The average liquor bottle contains about thirty-two ounces in liquid contents and while the register will register from zero to 99, it may be so constructed as to register only to a lower number. When constructed as illustrated it is possible to apply the register to three full bottles consecutively and to dispense the contents therefrom without requiring resetting of the counting mechanism.

From the above-described construction it will be appreciated that the dispensing device is a very simple and durable construction and that it may be applied to various types of bottles from which it is desirable to dispense liquids. It is very simple and easy to operate in that the bartender merely inverts the bottle to fill chamber 21 and then depresses trigger 30 to exhaust the contents of the chamber into the glass.

Various changes may be made in the details of construction without departing from the spirit or scope of the invention as defined by the appended claims.

We claim:

1. A device for dispensing liquids from bottles comprising means providing a housing applicable to the mouth of a bottle having an inlet leading from the interior of the bottle and an outlet leading from the housing, a trigger rotatably mounted upon the housing, a rotary cylinder within the housing providing a measuring chamber having openings in its wall adapted to be brought into registration with the inlet and outlet respectively, said openings being so arranged that when the inlet is open the outlet is closed, and when the outlet is open the inlet is closed, there being a vent opening in the housing leading to the exterior thereof and a vent opening in the cylinder adapted to register therewith when the outlet is open, means operable by the trigger for rotating the cylinder in the housing, and spring means normally urging the trigger and cylinder into a position wherein the outlet is closed.

2. A device for dispensing liquids from bottles comprising means providing a housing applicable to the mouth of a bottle having an inlet leading from the interior of the bottle and an outlet leading from the housing, the outlet being laterally directed with respect to the axis of the bottle neck, a trigger rotatably mounted upon the housing beneath the outlet arranged to be swung toward and away from the side of the bottle mouth, a rotary cylinder within the housing providing a measuring chamber having openings in its wall adapted to be brought into registration with the inlet and outlet respectively, said openings being so arranged that when the inlet is open the outlet is closed, and when the outlet is open the inlet is closed, there being a vent opening in the housing leading to the exterior thereof and arranged on the opposite side of the housing from the outlet and trigger, there being a vent opening in the cylinder adapted to register therewith when the outlet is open, means operable by the trigger for rotating the cylinder in the housing, and spring means normally urging the trigger and cylinder into a position wherein the outlet is closed.

3. A device for dispensing liquids from bottles comprising means providing a housing applicable to the mouth of a bottle having an inlet leading from the interior of the bottle and an outlet leading from the housing, a trigger rotatably mounted upon the housing adapted to be swung toward and away from the side of the mouth of the bottle, a rotary cylinder within the housing providing a measuring chamber having openings in its wall adapted to be brought into registration with the inlet and outlet respectively, said openings being so arranged that when the inlet is open the outlet is closed, and when the outlet is open the inlet is closed, there being a vent opening in the housing leading to the exterior thereof and a vent opening in the cylinder adapted to register therewith when the outlet is open, means operable by the trigger for rotating the cylinder in the housing, and spring means normally urging the trigger and cylinder into a position wherein the outlet is closed.

4. A device for dispensing liquids from bottles comprising means providing a housing applicable to the mouth of a bottle having an inlet leading from the interior of the bottle and an outlet leading from the housing, a trigger rotatably mounted upon the housing adapted to be swung toward and away from the side of the mouth of the bottle, a rotary cylinder within the housing providing a measuring chamber having openings in its wall adapted to be brought into registration with the inlet and outlet respectively, said openings being so arranged that when the inlet is open the outlet is closed, and when the outlet is open the inlet is closed, there being a vent opening in the housing leading to the exterior thereof, and a vent opening in the cylinder adapted to register therewith when the outlet is open, means operable by the trigger for rotating the cylinder in the housing, spring means normally urging the trigger and cylinder into a position wherein the outlet is closed, said cylinder having a reversible end wall which, on being reversed, changes the capacity of the measuring cylinder.

DAVID B. DALE.
N. O. NELSON.